June 24, 1958  G. A. LYON  2,840,419
WHEEL COVER
Filed June 8, 1955
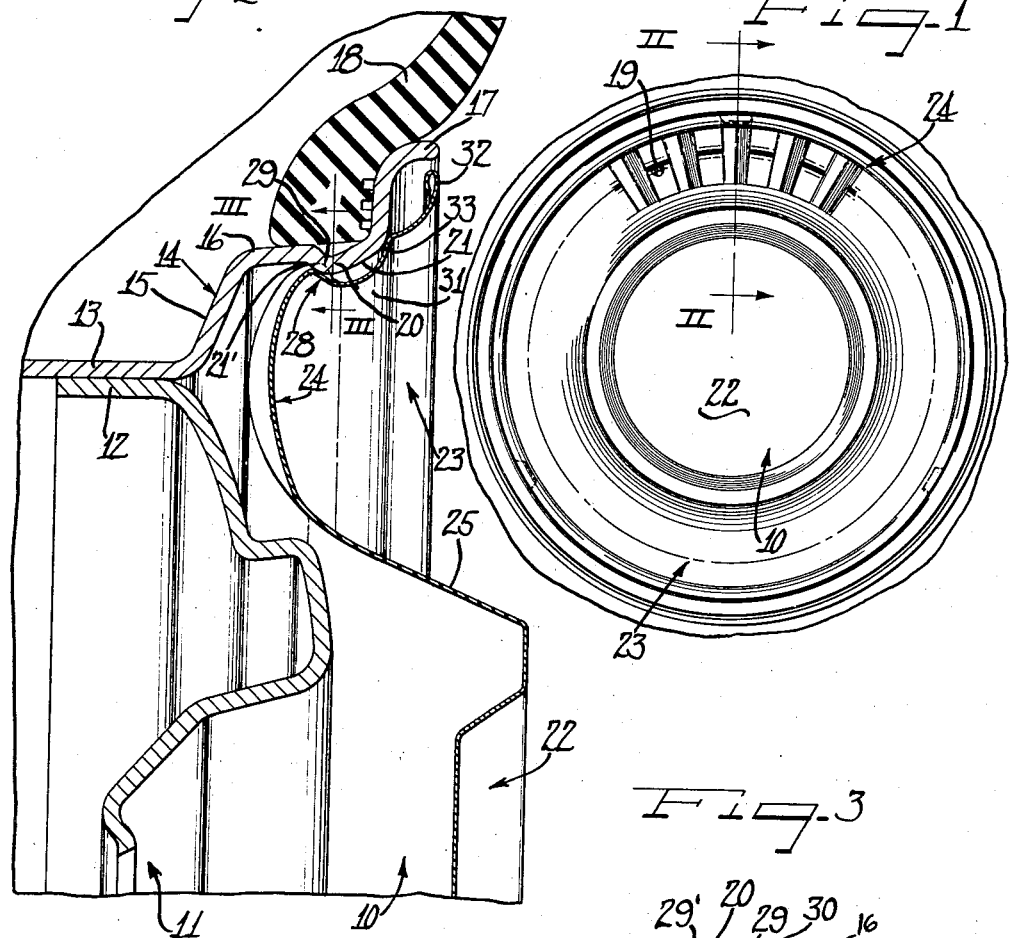
Inventor
George Albert Lyon

United States Patent Office 2,840,419
Patented June 24, 1958

2,840,419

WHEEL COVER

George Albert Lyon, Detroit, Mich.

Application June 8, 1955, Serial No. 513,953

10 Claims. (Cl. 301—37)

The present invention relates to improvements in spoke-type wheel structures and more particularly concerns the ornamental and protective covering of the outer sides of vehicle wheels.

An important object of the present invention is to provide an improved wheel structure provided with circumferentially spaced cover retaining bumps and including improved cover means for snap-on, pry-off assembly with the wheel.

Another object of this invention is to provide improved means on a wheel cover capable of snap-on, pry-off cooperation behind the cover retaining bumps.

A further object of this invention is to provide an improved wheel cover which lends itself to economical manufacture on a large production scale.

A still further object of this invention is to provide an improved spoke-type cover construction wherein the spokes are utilized as cover retaining elements.

Other objects, features and advantages of the present invention will be readily apparent from the following detailed description taken in conjunction with the accompanying drawings, illustrating a single embodiment thereof, in which:

Figure 1 is an enlarged fragmentary side elevational view of a vehicle wheel structure embodying features of the invention;

Figure 2 is an enlarged fragmentary radial sectional view taken substantially on the line II—II of Figure 1; and Figure 3 is an enlarged fragmentary deatil view of the cover of Figure 2 taken substantially on the line III—III thereof.

Referring now to the drawings and more particularly to Figures 1 and 2, a cover 10 is adapted to be disposed on the outer side of a vehicle wheel including a disk spider wheel body 11 having at the outer margin thereof a generally axially extending attachment flange 12 secured in any suitable manner to a base flange 13 of a drop center type tire rim 14. It will be appreciated that at suitable intervals the flange 12 may be inset to provide openings through the wheel for air circulation and the like. From the base flange 13, extends a rim side flange 15 sloping radially and aixally outwardly and merging with an intermediate generally axially outwardly and radially outwardly intermediate flange 16 which joins a generally radially outwardly and then axially outwardly turned terminal flange 17. The construction and relationship of the flanges on the tire rim are such that a tire and tube assembly or a tubeless tire 18 can be supported thereon. For inflation of the tire a valve stem 19 (Figure 2) projects at a suitable place from the side flange 15 of the tire rim 14.

In the present instance the intermediate flange 16 of the tire rim 14 has provided thereon a plurality of circumferentially spaced cover retaining bumps 20 which are formed from the wall of the flange.

The intermediate flange 16 is so formed as to have an axially and radially inwardly extending lead-in surface 21 which merges with the cover retaining U-shaped bumps 20. It will be appreciated that the bumps 20 define on their axially inner side thereof a cover retaining shoulder 21' behind which the cover may be retainingly lodged.

According to the present invention the cover 10 is constructed and arranged to be retained on the wheel by interengagement of retaining means provided thereon behind the shoulder 21. To this end, the cover 10 comprises a stamped or drawn sheet metal member which in the present instance is of the full disk type and of a diameter to substantially entirely cover the outer side of the wheel. Suitable material may be used in the making of the cover and excellent results have been found to be obtainable through the use of stainless steel or the like.

The cover 10 has a central crown area indicated generally at 22 which is adapted to overlie the central portion of the wheel body. Spaced radially outwardly from the inner crown 22 is an annular outer marginal cover portion 23 for overlying the tire rim and more especially the terminal flange 17 in the adjacent portion of the intermediate flange 16. Both of the inner and outer cover portions are of a substantially rigid construction. Connecting the crown portion 22 and the outer marginal portion 23 are a series of circumferentially spaced elongated resiliently deflectable spoke-like elements 24.

It will be appreciated that it is the spoke elements 24 which provide the means for snap-on, pry-off retention of the cover on the wheel. To this end, the spoke elements are constructed to extend from a continuous annular generally axially inwardly directed side flange 25 of the crown area 22 generally radially outwardly and axially inwardly to lie in substantial spaced relation from the wheel body 11 but to engage at their radially outer portions in cover supporting relation against the intermediate flange 16 of the tire rim. To enhance the resiliency of the spoke elements 24, the spoke elements are transversely arched, preferably axially outwardly throughout their lengths from the juncture with the crown flange 25 to the point at which the spoke elements are bottomed behind the cover retaining bumps 20. In addition, the spoke elements are of an inwardly dished or curved or arched form, thereby controlling radially inward and axially inward tensioned deflection thereof responsive to radially inward thrust or pressure exerted against the radially outer portions thereof.

The resilient spoke-like U-shaped elements 24 which include divergently extending legs 26 and 27 have provided thereon at their radially outer terminals cover retaining means 28.

The retaining means 28 includes inverted or indented radially outwardly offset finger-like extensions 29 which are formed in the generally U-shaped spoke-like elements 24. In so doing, the spoke-like element 24 is of a more or less W-cross section at the point of engagement behind the bumps 20 with the outer diverging legs 26 and 27 adapted to nestingly overlie to grip in a circumferential direction the circumferentially spaced bump shoulders 29' and 30. In so doing, co-rotation of the cover and wheel is insured.

At the junction of the radially outer terminal end of the spoke elements 24 with the outer cover portion 23 it will be noted that the radially inner area 31 of the outer cover portion 23 is indented radially inwardly and axially outwardly so as to afford complete clearance from the bumps 23 and the lead-in surface 21. The remainder of the outer cover portion 23 extends generally radially outwardly in spaced overlying relation to the terminal flange 17 and about the shoulder at the juncture of the terminal and intermediate flanges.

At its outer extremity, the cover portion 23 has an underturned reinforcing and finishing bead 32 which may be disposed in assembly adjacent to the tip of the terminal flange 17. Behind the outer cover portion 23 is provided a substantial chamber with the terminal flange to afford a concealed housing for a wheel balancing weight. For rigidity and to provide a convenient inner pry-off shoulder, the outer annular cover member 23 is provided with an intermediate generally axially inwardly indented annular rib 33 which is adapted to oppose in spaced adjacency the juncture shoulder between the terminal and intermediate flanges of the tire rim.

The cover 10 may be mounted on the outer side of the wheel by centering the cover with respect to the wheel, aligning the valve stem 19 so that it will project between the openings between the spoke element 24 and applying an inward pressure against the cover 10 to cause the retaining extensions 29 to be cammed and progressively flexed over the lead-in surface 21 until the extensions snap over and behind the bumps 20 into retaining relation behind the shoulder. It will be appreciated that in so applying the cover that the spoke-like elements 24 will be resiliently flexed and as a consequence thereof will exert a radially outward tensioning reaction through the retaining extensions 29 thereby developing a firm retaining grip behind the bump 20.

In removing the cover from the wheel, a suitable pry-off tool such as a screw driver or the like, may be applied behind the outer bead 32 and levered against the terminal flange 17, with additional pry-off leverage exerted against the reinforcing and pry-off rib shoulder 33 as the tool is worked further under the cover, until the retaining finger-like extensions 29 are flexed out of engagement outwardly past the retaining bumps 20.

It will be understood that modifications and variations may be effected without departing from the novel concepts of the present invention.

I claim as my invention:

1. In a wheel structure including a stepped tire rim and body parts with the rim having a generally axially and radially outwardly inclined flange having an axially and radially inwardly inclined lead-in surface merging with a plurality of circumferentially spaced U-shaped cover retaining shoulders extending generally radially inwardly thereof, a cover including relatively rigid inner and outer cover portions joined together by a plurality of elongated resiliently deflectable spoke-like elements capable of being progressively cammed over said lead-in surface and thereafter lodged behind said retaining shoulder in snap-on, pry-off engagement with the wheel, said elements being of a generally U-shaped longitudinal cross section at the inner end thereof, a generally W-shaped cross section at the junction of said elements behind said cover retaining shoulders, and a generally U-shaped longitudinal cross section at the outer end thereof in order to be capable of being nestingly engaged over said shoulder to insure co-rotation of the wheel and cover, said elements being normally of a diameter slightly larger than the inside diameter of said flange to permit tensioned cover retaining engagement behind said retaining shoulder.

2. In a wheel structure including rim and body parts having provided thereon cover retaining shoulder means, a cover for disposition on the wheel including inner and outer relatively rigid cover portions connected together by a plurality of circumferentially spaced resiliently deflectable spoke-like elements, said elements having formed thereon generally radially outwardly inverted gripping extensions deformed from the plane of said elements, said extensions capable of being progressively flexed into tensioned bottomed engagement behind said shoulder means.

3. In a wheel structure including a body part and a stepped wheel rim having an axially extending intermediate flange having provided thereon cover retaining shoulder means, a cover for disposition on the wheel including inner and outer relatively rigid cover portions connected together by a plurality of circumferentially spaced resiliently deflectable spoke-like elements, said elements having formed thereon generally radially outwardly inverted gripping extensions deformed from the plane of said elements, said shoulder means including a generally axially and radially inclined lead-in surface merging with a cover retaining bump extending radially inwardly from the plane of the intermediate flange and defining with said intermediate flange a groove in which said extensions are capable of residing in tensioned engagement therewith in assembly.

4. In a wheel structure including rim and body parts having provided thereon cover retaining shoulder means, a cover for disposition on the wheel including inner and outer relatively rigid cover portions connected together by a plurality of circumferentially spaced resiliently deflectable spoke-like elements, said elements having formed thereon generally radially outwardly inverted gripping extensions deformed from the plane of said elements and being capable of being progressively flexed into tensioned bottomed engagement behind said shoulder means, said elements being provided with means to insure relative co-rotation of the wheel with the cover.

5. In a wheel structure including rim and body parts having provided thereon cover retaining shoulder means, a cover for disposition on the wheel including inner and outer relatively rigid cover portions connected together by a plurality of circumferentially spaced resiliently deflectable spoke-like elements, said elements having formed thereon generally radially outwardly inverted gripping extensions deformed from the plane of said elements and being capable of being progressively flexed into tensioned bottomed engagement behind said shoulder means, said outer cover portion being spaced radially inwardly from said shoulder means and projecting generally axially outwardly and connected to a generally axially inwardly extending annular continuous flange portion of said outer cover portion.

6. In a wheel structure including rim and body parts having provided thereon cover retaining shoulder means, a cover for disposition on the wheel including inner and outer relatively rigid cover portions connected together by a plurality of circumferentially spaced resiliently deflectable spoke-like elements, said elements having formed thereon generally radially outwardly inverted gripping extensions deformed from the plane of said elements and being capable of being progressively flexed into tensioned bottomed engagement behind said shoulder means, said outer cover portion being spaced radially inwardly from said shoulder means and projecting generally axially outwardly and connected to a generally axially inwardly extending annular continuous flange portion of said outer cover portion, said outer cover portion having intermediate the outer extremity thereof and the inner extremity thereof an indented annular pry-off rib enhancing the rigidity thereof and facilitating pry-off of the cover without damage.

7. In a wheel structure including rim and body parts having provided thereon cover retaining shoulder means, a cover for disposition on the wheel including inner and outer relatively rigid cover portions connected together by a plurality of circumferentially spaced resiliently deflectable spoke-like elements, said elements having formed thereon generally radially outwardly inverted gripping extensions deformed from the plane of said elements and being capable of being progressively flexed into tensioned bottomed engagement behind said shoulder means, said spoke-like elements being transversely arched as well as longitudinally arched for enhancing the resilient tensioned engagement between said extensions and said shoulder means.

8. In a wheel structure including rim and body parts having cover retaining shoulder means, a cover to be disposed on the wheel including a plurality of longitudinally arched spoke simulating resilient elements each being of a generally W-cross section at the point of cover retaining intersection between said spoke elements and said shoulder means, said W-shaped elements at the point of intersection including a cover retaining extension capable of retainingly cooperating with said shoulder means to retain same on the wheel, and spaced flange means capable of nestingly overlying said shoulder means so as to insure relative co-rotation of the wheel with the cover.

9. In a wheel structure, a wheel including rim and body parts having provided thereon cover retaining shoulder means, a cover for disposition on the wheel including inner and outer cover portions connected together by a plurality of circumferentially spaced resiliently deflectable spoke-like elements, said elements having formed thereon generally radially inverted gripping extensions deformed from the plane of said elements, said extensions capable of being progressively flexed in tensioned bottomed engagement behind said shoulder means, said cover having an outer terminal margin overlying and facing the wheel to receive therebetween a pry-off member to disengage said inverted gripping extensions from behind said shoulder means.

10. In a wheel structure, a wheel including rim and body parts having provided thereon cover retaining shoulder bumps, a cover for overlying disposition on the wheel including inner and outer relatively rigid cover portions connected together by a plurality of circumferentially spaced resiliently deflectable spoke-like elements, said elements being generally transversely arched to augment the resiliency thereof and said elements having shoulders arranged in a common circle having a diameter slightly at variance with the diameter of the cover retaining shoulder bumps for press-on, pry-off retaining engagement with the bumps and edges on the sides of at least one of the elements coactive with the engaged bump to maintain the cover corotative with the wheel when the shoulders are progressively flexed into tensioned bottomed detachable engagement behind said shoulder means.

References Cited in the file of this patent

UNITED STATES PATENTS

| | | |
|---|---|---|
| 2,198,056 | Lyon | Apr. 23, 1940 |
| 2,212,039 | Lyon | Aug. 20, 1940 |